United States Patent [19]

Syska

[11] 4,445,842

[45] May 1, 1984

[54] RECUPERATIVE BURNER WITH EXHAUST GAS RECIRCULATION MEANS

[75] Inventor: Andrew J. Syska, Marblehead, Mass.

[73] Assignee: Thermal Systems Engineering, Inc., Woburn, Mass.

[21] Appl. No.: 318,372

[22] Filed: Nov. 5, 1981

[51] Int. Cl.³ .............................................. F23L 15/04
[52] U.S. Cl. ................................... 431/115; 431/215; 431/238; 431/187
[58] Field of Search .................... 431/115, 215, 116, 5, 431/243, 9, 11, 238; 165/DIG. 2; 432/21, 72, 179, 180, 222, 29; 110/204, 302

[56] References Cited

U.S. PATENT DOCUMENTS

| | | | |
|---|---|---|---|
| 275,528 | 4/1883 | Schülke | 431/215 |
| 3,146,821 | 9/1964 | Wuetig | 432/47 |
| 3,168,132 | 2/1965 | Axelsson | 431/116 |
| 3,174,526 | 3/1965 | Von Linde | 431/116 |
| 3,604,824 | 9/1971 | Hardison | 432/72 |
| 3,652,194 | 3/1972 | Bailey | 431/9 |
| 3,829,285 | 8/1974 | Beck | 165/DIG. 2 |
| 3,880,570 | 4/1975 | Marshall | 431/4 |
| 3,934,572 | 1/1976 | Teague, Jr. | 126/92 B |
| 4,005,977 | 2/1977 | Kawamura | 431/116 |
| 4,023,558 | 5/1977 | Lazaridis | 126/391 |
| 4,277,942 | 7/1981 | Egnell et al. | 431/116 |
| 4,324,545 | 4/1982 | Hubbert | 431/116 |

OTHER PUBLICATIONS

NTIS Report No. PB80-205438.
Product Information Bulletin 8010.
North American Hotwork Brochure.

Primary Examiner—Samuel Scott
Assistant Examiner—Allen J. Flanigan

[57] ABSTRACT

A recuperative burner having a recirculating conduit to direct flue gas to the combustion chamber with the air and fuel, and a compact recuperative stack with a recuperative flue gas conduit and an air passage in which air separated from the flue gas by the recuperative flue gas conduit is preheated before supplying it to the combustion chamber.

8 Claims, 1 Drawing Figure

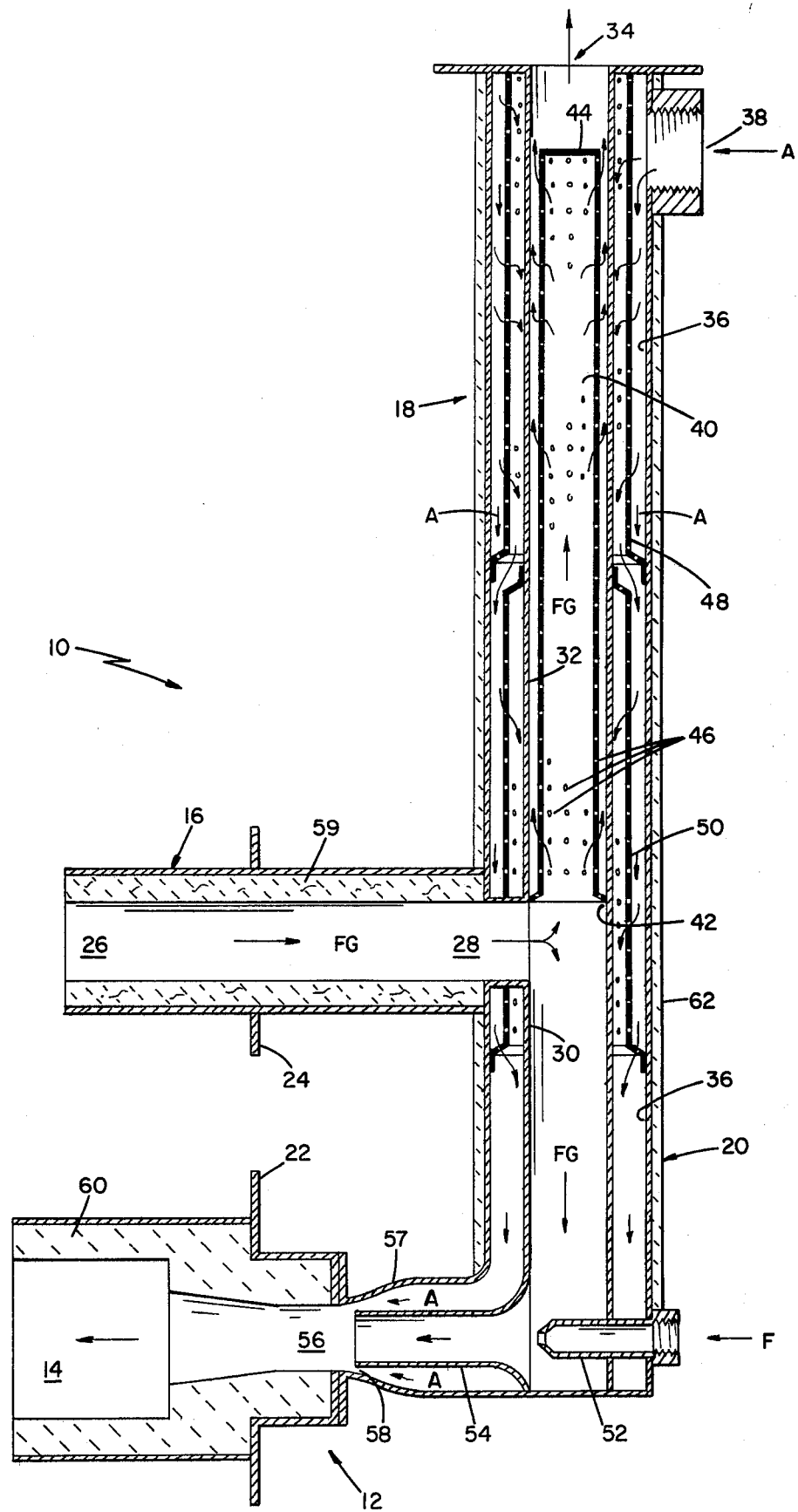

RECUPERATIVE BURNER WITH EXHAUST GAS RECIRCULATION MEANS

FIELD OF THE INVENTION

The invention relates to recuperative burners for furnaces.

BACKGROUND OF THE INVENTION

Recuperative burners use heat in furnace flue gases to preheat air, e.g., by having the flue gas and air flow past a common partition, to reduce fuel requirements, and eductors are generally used to pull the flue gases through the heat exchanging passages. In a "self-recuperative burner" the heat exchanger is made integral with the burner to avoid the heat loss and usage of space associated with having the heat exchanger located externally of the furnace. Recuperative burners generally operate at higher flame temperatures, owing to the preheated air, thereby increasing the $NO_x$ content in the furnaces and the flue gases.

SUMMARY OF THE INVENTION

In general the invention features a recuperative burner having a recirculating conduit to direct flue gas to the combustion chamber with the air and fuel, and a compact recuperative stack with a recuperative flue gas conduit and an air passage in which air separated from the flue gas by the flue gas conduit is preheated before supplying it to the combustion chamber. In such a device preheating the air reduces fuel requirements, and mixing the recycled flue gas with the preheated air and fuel reduces the burner flame temperature, thereby reducing $NO_x$ emissions, and also improves temperature uniformity in the furnace.

In preferred embodiments a flue gas connector supplies the furnace gas to the recuperative stack and the recirculating conduit; the recuperative flue gas conduit is an inner conduit, and the air passage is provided by a tube completely surrounding the inner flue gas conduit and the recirculating conduit; the recuperative flue gas conduit is adapted to provide low flue gas pressure drop; the recuperative flue gas conduit has a perforated member in it to impinge the heated flue gas against the surface of the flue gas conduit to decrease the size of the insulating boundary layer and to improve the heat transfer while still providing low flue gas pressure drop in and compactness to the recuperative stack; the air passage has a perforated member in it to similarly impinge the air against the surface of the flue gas conduit to decrease the size of the insulating boundary layer and also improve heat transfer; and the end of the air conduit communicating with the combustion chamber surrounds an inner tube for directing the recirculated flue gas and fuel to the combustion chamber.

DESCRIPTION OF THE PREFERRED EMBODIMENT

The structure and operation of the presently preferred embodiment of the invention will now be described after first briefly describing the drawing, which is a somewhat diagrammatic vertical sectional view of a burner according to the invention.

STRUCTURE

Referring to the FIGURE, there is shown burner 10 having housing 12 (enclosing combustion chamber 14), flue gas connector 16, 48" tall recuperative stack 18, and 20" tall recirculating stack 20. Housing 12 and connector 16 have flanges 22, 24, respectively, for bolting to a furnace wall (not shown). Flue gas connector 16 has inlet 26 for communication with a furnace and end 28 connected to recirculating conduit 30, for directing recirculated flue gas FG to combustion chamber 14, and to inner recuperative flue gas conduit 32, which is made of heat conductive stainless steel and has an open end 34 for directing flue gas FG to the atmosphere. An air flow path for air A is provided in recuperative stack 18 between outer tube 36 and recuperative flue gas conduit 32. The air flow path has air inlet 38 and continues below stack 18 between recirculating conduit 30 and the lower end of outer tube 36, which also continues below stack 18. Within recuperative flue gas conduit 32 is perforated ($\frac{1}{4}$" to $\frac{3}{4}$" holes) cylinder 40, which is sealed at its bottom 42 to the inside of conduit 32 and is closed at its top 44, requiring flue gas passing through stack 18 to go through holes 46. Perforated members 48, 50 are similarly placed in the air flow passage and sealed to outer tube 36 and the outer surface of recuperative conduit 32 to require air to pass through the holes in them. (The structure of the cylindrical perforated members in recuperative stack 18 is described in NTIS Report No. PB80-205438.)

At the lower end of recirculating conduit 30 is gaseous fuel nozzle 52 and tubular member 54 for directing gaseous fuel F and recirculated flue gas FG to inlet 56 of combustion chamber 14. Surrounding tube 54 is tube 57; annular passage 58 between tubes 54 and 57 directs the air from the air flow passage to inlet 56. Annular passage 58 is small enough so that air supplied under pressure creates sufficient suction to pull the recirculated flue gas and fuel through tubular member 54.

The perforated members provide for an efficient, compact heat exchanger that also has low flue gas pressure drop, permitting the avoidance of an eductor to pull the flue gas in most applications. The use of flue gas connector 16 to feed both recirculating stack 20 and recuperative stack 18, and the use of outer tube 36 for both recirculating stack 20 and recuperative stack 18, also contribute to the compactness of burner 10.

Insulation 59 is provided on the inside of flue gas connector 16, and insulation 60 is provided in housing 12 to define combustion chamber 14. The exteriors of recirculating stack 20 and recuperative stack 18 are provided with insulation 62, which is not as thick as insulation 59, 60, because of the lower temperatures of the air flow passage.

OPERATION

In operation flue gas FG drawn into end 26 of flue gas connector 16 splits at end 28 into one stream passing upward through recuperative stack 18 and another stream passing downward through recirculating conduit 30. The stream in recirculating conduit 30 mixes with fuel F from gaseous fuel nozzle 52 and is drawn through tubular member 54 into inlet 56 of chamber 14 owing to the suction created by preheated air forced through annulur passage 58. In combustion chamber 14 gaseous fuel F is ignited, generating heat for the furnace.

The stream of flue gas FG passing upward through stack 18 passes transversely through holes 46 of inner perforated member 40 and impinges against the inner surface of recuperative flue gas conduit 32, decreasing the size of the boundary layer on the inner surface of conduit 32, and efficiently transferring heat to conduit 32. The flue gas between perforated member 40 and inner flue gas conduit 32 then continues upward in the stack and leaves through open end 34.

Air A is supplied under pressure through inlet 38 to the air passage between flue gas conduit 32 and outer tube 36. In traveling from inlet 38 to combustion chamber 14, air A is forced to impinge against the outer surface of heat conducting flue gas conduit 32 twice, owing to the holes in cylindrical perforated members 48, 50. Once again the transverse flow of the air acts to decrease the thickness of the insulating boundary layer surrounding conduit 32, thereby increasing the heat transfer efficiency. In passing through the air passage, air A increases in temperature between 400° and 800° F., depending on the furnace temperature, thereby decreasing the fuel requirements of burner 10. Because the pressure drop in the flue gas passing through recuperative conduit 32 is low (about 0.01" to 0.05" water column), an eductor to pull the flue gas through open end 34 is not required in most applications.

The use of preheated air acts to increase the flame temperature, thereby increasing $NO_x$ content in the flue gas, but the use of recirculated flue gas acts to lower the flame temperature, thereby reducing the $NO_x$ content. The recirculation of the furnace gas also provides improved temperature uniformity in the furnace, owing the greater mass of gas issuing from the burner. Because the air passage surrounding the flue gas conduits 30, 32 is at a lower temperature (generally between 400° F. and 800° F.) than the furnace temperature, a small amount of insulation can be used for the exterior surfaces of recuperative stack 18 and recirculating stack 20.

OTHER EMBODIMENTS

Other embodiments of the invention will become apparent to those skilled in the art. For example only, a few are mentioned. Burner 10 can be used with liquid fuel in addition to gaseous fuel, in which case the liquid fuel can be introduced in conduit 30 close to end 28, and means could be provided to create a vortex to effectively vaporize the liquid fuel droplets. Also, if the furnace is for operation above 1,600° to 1,800° F., where the infrared intensity increases substantially, and heat transfer to conduit 32 by radiation predominates, perforated cylinder 40 is not needed to provide efficient heat transfer.

What is claimed is:

1. A recuperative burner for a furnace comprising
a housing having a combustion chamber in it,
said combustion chamber having an outlet for communication with said furnace and an inlet for receiving air, recirculated flue gas, and fuel,
a recuperative stack to preheat air supplied to said combustion chamber inlet to reduce fuel requirements of said burner,
said recuperative stack having
a recuperative flue gas conduit made of a heat conductive material and having one end for receiving flue gas from said furnace and another end for communication with the atmosphere, and
an air passage separated from flue gas by said recuperative flue gas conduit and having an inlet for connection to a pressurized source of air and an outlet in communication with said chamber inlet,
a fuel inlet nozzle in said housing for directing fuel to said chamber inlet, and
a recirculating flue gas conduit with one end for receiving flue gas from said furnace and another end connected to direct recirculated flue gas to said combustion chamber at a location causing mixing of said flue gas and fuel upstream of said air outlet so as to reduce the flame temperature, thereby reducing the $NO_x$ content.

2. The burner of claim 1 further comprising a flue gas connector having an inlet for communication with said furnace and an outlet connected to said one end of said recuperative flue gas conduit and to said one end of said recirculating flue gas conduit.

3. The burner of claim 2 wherein said recuperative flue gas conduit is an inner conduit, and said air passage is provided by a tube completely surrounding said inner flue gas conduit and said recirculating conduit, whereby a small amount of insulation will be effective to cover the exterior of the recuperative stack and recirculating conduit, owing to the reduced temperature in the outer air passage.

4. The burner of claim 1 wherein said recuperative conduit has a perforated member in it to impinge heated flue gas against the surface of said recuperative flue gas conduit to decrease the size of the insulating boundary layer and to improve heat transfer while still providing a low flue gas pressure drop in and compactness to said recuperative stack.

5. The burner of claim 4 wherein said air passage has a perforated member in it to impinge said air against the surface of said recuperative flue gas conduit to decrease the size of the insulating boundary layer and to improve heat transfer while providing low air pressure drop in and compactness to said recuperative stack.

6. The burner of claim 3 wherein said outer air passage has a perforated member in it to impinge said air against the outer surface of said inner flue gas conduit to decrease the size of the insulating boundary layer and to improve heat transfer while providing low air pressure drop in and compactness to said recuperative stack.

7. The burner of claim 6 further comprising a flue gas connector having an inlet for communication with said furnace and an outlet connected to said one end of said recuperative flue gas conduit and to said one end of said recirculating flue gas conduit, and wherein said recuperative flue gas conduit is an inner conduit and said air passage is provided by a tube completely surrounding said inner flue gas conduit and said recirculating conduit.

8. The burner of claim 3, 6 or 7 wherein the end of said tube providing said air passage communicates with another tube that is connected to said chamber inlet and surrounds an inner tube directing recirculated flue gas and fuel to said combustion chamber, whereby air forced into said chamber inlet from said pressurized source creates suction drawing said flue gas and fuel into said chamber.

* * * * *